United States Patent [19]
Hartelius, Jr.

[11] 4,059,338
[45] Nov. 22, 1977

[54] INTEGRATED OPTICAL WAVEGUIDE COUPLER

[75] Inventor: Clifford C. Hartelius, Jr., Sunnyvale, Calif.

[73] Assignee: Sharp Kabushiki Kaisha, Osaka, Japan

[21] Appl. No.: 611,649

[22] Filed: Sept. 9, 1975

[51] Int. Cl.² .............................. G11B 7/12; G02B 5/14
[52] U.S. Cl. ........................... 350/96 C; 350/96 WG;
179/100.41 L; 179/100.3 V; 179/100.3 E; 358/128
[58] Field of Search ................. 350/96 WG, 96 C; 179/100.41 L, 100.3 V, 100.3 L, 100.3 E; 358/128

[56] References Cited

U.S. PATENT DOCUMENTS

| | | | |
|---|---|---|---|
| 3,584,230 | 6/1971 | Tien | 350/96 WG X |
| 3,948,583 | 4/1976 | Tien | 350/96 WG |

OTHER PUBLICATIONS

Fernike, F., Midwinter, J. E. "Improved Version of the Evanescent-Wave Coupler" IEEE J. of Quantum Elec., vol. QE-6, No. 9 Sept. 1970, pp. 577–578.

Harris, J. H., Shubert, R., Polky, J. N. "Beam Coupling to Films" J. Optical Society of America, vol. 60, No. 8, Aug. 1970, pp. 1007–1016.

*Primary Examiner*—John K. Corbin
*Assistant Examiner*—Rolf Hille

[57] ABSTRACT

An integrated optical waveguide coupler for coupling energy in one direction to illuminate an optical stylus tip and for carrying energy received by said tip in the opposite direction to a remote transducer. The integrated coupler includes a substrate comprising a first relatively low refractive index material having a face and a second relatively high refractive index material formed on said face, as a right angle prism. A low refractive index layer of predetermined thickness is interposed between said substrate and the optical waveguide. Light energy incident to a surface of the prism is coupled to the waveguide.

9 Claims, 2 Drawing Figures

INTEGRATED OPTICAL WAVEGUIDE COUPLER

CROSS-REFERENCE TO RELATED APPLICATIONS

CONTACTING PICKUP OPTICAL REPRODUCTION SYSTEM, Ser. No. 502,810, filed Sept. 3, 1974, now U.S. Pat. No. 3,980,811 invented by Louis R. Schaefer, Philip J. Rice and Hugh F. Frobach, and assigned to a common assignee.

BACKGROUND OF THE INVENTION

This invention relates generally to the field of integrated optical structures and a method for fabrication of the structures. More particularly, this invention relates to an integrated optical coupler for coupling energy in one direction to an optical stylus tip and for carrying energy received by the tip in the opposite direction.

Although optical couplers for coupling energy to waveguides have heretofore been provided, such couplers have been excessively bulky and complex, required pressure between mating optical surfaces, admitted dirt and other foreign matter, and suffered from less than optimal coupling efficiencies. Thus, there is a need for an improved performance integrated optical coupler, particularly suitable for coupling energy to an optical stylus tip and for carrying reflected energy received by said tip to a remote transducer.

OBJECTS AND SUMMARY OF THE INVENTION

Accordingly, it is a general object of the present invention to provide an improved performance, integrated optical coupler for coupling energy to an optical waveguide.

It is a particular object of the present invention to provide an improved integrated optical coupler structure for coupling light energy to an optical waveguide in one direction for illumination of a stylus tip and for carrying reflected energy received by said tip in the opposite direction.

It is a further particular object of the present invention to provide a method for coupling light energy to an optical waveguide in one direction simultaneous with the coupling of reflected energy in the opposite direction.

The foregoing and other objects of the invention are achieved in an integrated optical waveguide coupler for coupling energy in one direction to illuminate an optical stylus tip and for carrying reflected energy received by said tip in the opposite direction. The integrated coupler includes a substrate comprising a first relatively low refraction index material having a face and a second relatively high refractive index material formed on the said face. The substrate has a planar top surface at right angles to said face to define a light corner within the second material at the surface. The substrate further has a light receiving surface defined by a plane intersecting the face and the planar top surface at a predetermined angle, $\theta$, with respect to said top surface. A layer of relatively low refractive index material is formed on the planar top surface and has a thickness ranging from $\frac{1}{8}$ to $\frac{1}{4}$ of the equivalent vacuum wavelength at the coupler operating wavelength. An optical waveguide is formed along the upper surface of the layer and overlaps the light corner. When light energy of a predetermined operating wavelength is provided incident to the light receiving surface at a predetermined entrance angle with respect to said top surface, a portion of said planar top surface adjacent the light corner is illuminated and energy is coupled to the waveguide.

DESCRIPTION OF THE PREFERRED EMBODIMENT

Figure 1:
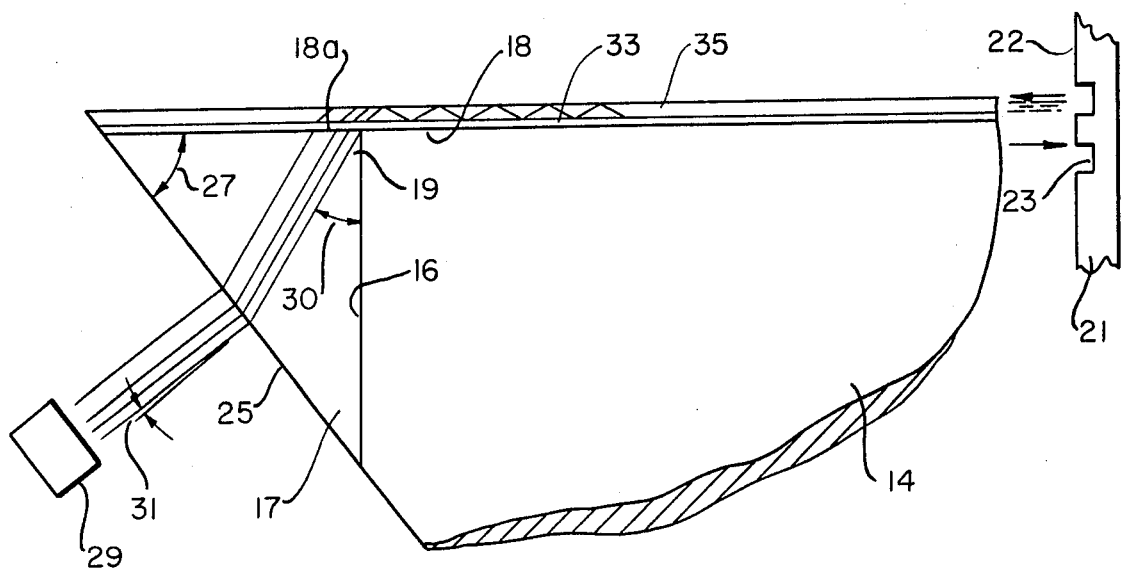
FIG. 1 is a side view, partly in cross-section, showing the integrated optical coupler.

Referring to FIG. 1, the integrated optical coupler is shown. Starting with a first relatively low refractive index material 14, such as quartz, $R_i \simeq 1.5$ or sapphire $R_i \simeq 1.77$, a substantially planar face 16 is prepared by conventional methods, such as by grinding and lapping. Next, a high refractive index material 17, such as rutile ($R_i \simeq 2.9$), is affixed to surface 16, such as by epoxy bonding. Next, the combination substrate is formed to the desired predetermined shape such as by grinding and polishing. A top planar surface 18 is formed at right angles to face 16, thereby defining a light corner 19 within the second material 17 at surface 18. Surface 18, as will be seen, may be the trailing vertical surface of an optical pickup stylus formed by shaping material 14, such as sapphire, in a rounded contacting or non-contacting stylus tip to be carried by or spaced from a record 21 having an information groove 22 including a plurality of pits 23 formed in the groove.

As previously disclosed in the cross-referenced application, CONTACTING PICKUP OPTICAL REPRODUCTION SYSTEM, the stylus 14 may have a tip which slidably contacts the information groove 22. The stylus 14 may be adapted to be connected to a pickup arm (not shown) which is capable of mechanically holding stylus 14 as the information groove 22 having pits 23 formed therein is moved beneath the tip 14a of stylus 14. The substrate including material 14 and material 17 is further shaped to form a light receiving surface 25 defined by a plane surface intersecting face 16 and further intersecting planar top surface 18 at a predetermined angle $\theta$, 27 with respect to top surface 18. Thus, the high refractive index material such as rutile is formed into a prism having a right angle corner 19. Angle $\theta$, 27, may be calculated for a predetermined entrance angle at the particular wavelength of the light source used with the coupler. A light source 29 is positioned to provide a beam directed on a path, said beam being incident to surface 25. For example, angle 27 may be approximately 43°–45° for a material 17 of rutile, and the wavelength of the source 29 may be approximately 6328 Angstroms. The beam from source 29 forms an entrance angle 31 with respect to the normal of surface 25. Angle 31 may be calculated to be 0°, that is, the beam is substantially normal to surface 25.

Next, the layer 33 formed of a low refractive index material is deposited over the top surface 18 formed of material 14 and 17. Layer 33 may have a thickness ranging typically from $\frac{1}{8}$ to $\frac{1}{4}$ of the equivalent vacuum wavelength at the light source operating wavelength. It has been found that a low refractive index material, such as silicon dioxide, may readily be formed on surface 18 using conventional techniques and provides sufficient light coupling for relatively high coupler efficiencies ranging from 60 to 80 per cent. Next, a relatively thin dielectric film 35 is formed on the surface of layer 33. A tantalum pentoxide, Ta$_2$O$_5$, layer (R:≃2.2) may be formed by conventional reactive sputtering techniques on layer 33 to a thickness ranging from 0.1 to 0.5 microns in thickness. Next, the tantalum pentoxide layer may be readily patterned into a rectangular waveguide having a stripe configuration utilizing standard electron beam lithography and ion beam micromachining. Cross-referenced application, CONTACTING PICKUP OPTICAL REPRODUCTION SYSTEM, discloses a deposition technique for forming the optical waveguide. The waveguide 35 is patterned to overlie corner 19 and a portion 18a of a surface 18 lying immediately adjacent corner 19 within material 17. Next, as discussed in the cross-referenced application, a passivating layer of silicon dioxide may be formed over the entire upper surface to protect the coupler from dirt and other foreign matter.

In operation of the coupler, the light source 29, such as a laser, directs a beam having a collimation of approximately 4 milliradians or less at an angle 31 incident to surface 29. As is well known in the art, a change of direction of propagation of a wave phenomenon occurs when the wave velocity changes at the interface between refractive media. It is to be appreciated that at the arrival of wave fronts at a surface 25 at substantially right angles causes the well known directional change due to refraction as defined by Snell's Law. Briefly, if waves travelling through one medium at one velocity V$_1$ are incident on a boundary surface at an angle $\phi_1$ (with respect to the normal), and after refraction enter the second medium at angle $\phi_2$ (with the normal) while travelling at velocity V$_2$ then:

$$V_1/V_2 = \sin \phi_1/\sin \phi_2 \quad (1)$$

Further, the index of refraction n of a medium is defined as the ratio of the velocity of waves in vacuum c to their velocity in the medium. Thus $c = n_1 v_1 = n_2 v_2$ and substituting:

$$n_1(\sin \phi_1) = n_2(\sin \phi_2) \quad (2)$$

Of course the refracted ray, being normal to a surface, and the incident ray all lie in the same plane.

Thus in the present invention, the light source is directed at an angle of substantially 90° incident to surface 25 and upon entering the medium 17, rutile, is refracted to illuminate a portion of surface 18 at area 18a. The area 18a illuminated is spaced from the corner 19 such that the entire beam width impinges upon the surface 18, and does not overlap the corner 19 to fall on surface 16. The angle 30 with respect to the normal is predetermined by Snell's Law such that the angle is less than the critical angle to ensure refraction at the medium 17 to 33 interface. The critical angle may be defined as the largest value angle 30 can have without total internal reflection taking place, wherein the rays are reflected from the interface of medium 17 and medium 33. Applying Snell's Law, when a wave travels from a region of low velocity (high index material 17) to one of high velocity (low index material 33) refraction occurs only if $(n_1/n_2) (\sin$ angle $30) \leq 1$. The rays emergent from layer 33 at the interface with the tantalum pentoxide layer are further refracted. Moreover at the upper waveguide 35 to an interface the critical angle is exceeded and frustrated internal reflection occurs to efficiently change the direction of the light rays without significant loss of energy. Accordingly, light energy from the source 29 is transferred across layer 33 and thence into waveguide 35 by frustrated internal reflection. The layer 33 has an equivalent thickness equal to that of a thin vacuum gap of between ¼ and ⅛ wavelength. The layer 33 for SiO$_2$ may be approximately 700 Angstroms in thickness. It is to be appreciated that the evanescent fields of the prism formed of rutile material 17 and the film 33 overlap sufficiently at distances of approximately ¼ wavelength or less to provide sufficient light coupling from the prism into the thin film optical waveguide 35. The frustrated total internal reflection observed and the fraction transmitted depends on the separation between the prism formed of material 17 and the thin film waveguide 35. It has been found that for the disclosed materials and wavelength of operation that efficiencies ranging from 60 to 80 percent of a light incident on the surface 25 can be successfully transferred into a waveguide 35. Higher order propagation modes may be utilized, but losses correspondingly increase thereby reducing coupling efficiency.

It is further to be appreciated that although the first material 17 of rutile (R$_i$ of ≃2.9) and the tantalum pentoxide (R$_i$ ≃2.2), separated by the silicon dioxide (R$_i$ ≃1.5) have been disclosed, other like materials having relatively low index material and provide a similar effect. Although the source has been disclosed as a laser, other suitable sources such as an LED (light-emitting-diode), an injection laser and fiberoptics may also be utilized, but require additional lensing to approach the efficiency obtained using the laser herein disclosed.

Figure 2:
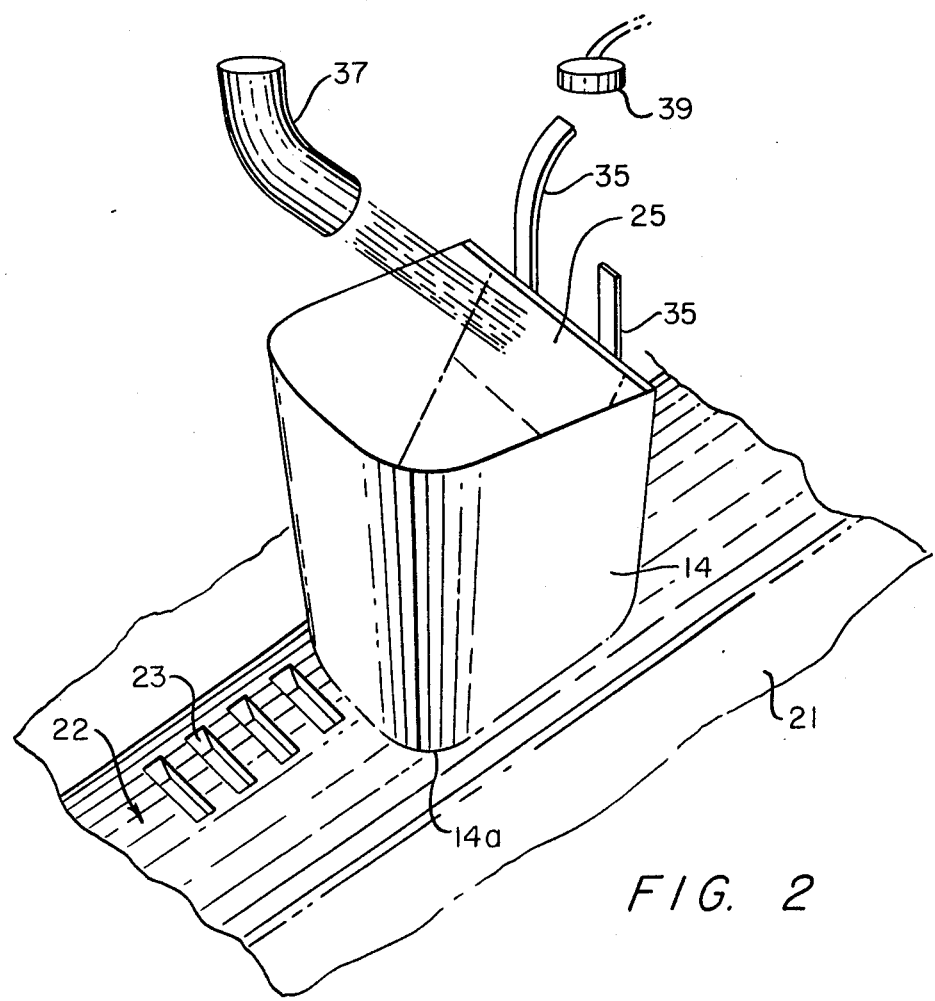
FIG. 2 is an isometric view, partly in cross-section, showing the integrated coupler in combination with a single waveguide optical readout stylus slidably contacting an information groove.

Referring to FIG. 2, the FIG. 1 structure may be seen wherein material 14 has been shaped into a rounded tip 14a which may not be in contact with an information groove 21 formed on a record or disc. Pits 22 and 23 may be provided spaced along a groove 22 and stylus 14 slidably moved along groove 21, wherein the illumination provided by the coupler of FIG. 1 such as by fiber-optic bundle 37 which with additional lensing provides a beam directed to be incident upon surface 25 and thence be coupled to waveguide 35 and via guide 35 to tip 14a to illuminate the path including pits 22. The light reflected from pits 22 is likewise received by the same tip and the received reflected light energy propagated via waveguide 35 in the direction opposite the source illumination to a remote transducer such as a photo diode 39 as shown in optical communication with the waveguide 35.

Thus, it is apparent that there has been provided an improved performance, integrated optical coupler for coupling energy to an optical waveguide. Further, an improved integrated optical coupler structure for coupling light energy to an optical waveguide in one direction for illumination of a stylus tip and for carrying reflected energy received by said tip in the opposite direction has been provided. Moreover, a method has been provided for coupling light to an optical waveguide in one direction simultaneously with the coupling of reflected energy in the opposite direction.

I claim:

1. An integrated optical waveguide coupler for coupling energy in one direction to illuminate an optical stylus tip and for carrying reflected energy received by said tip in the opposite direction, the coupler comprising, a substrate including a first relatively low refractive index material portion having a face and a tip opposite said face and a second relatively high refractive index material portion formed on said face, said substrate having a planar top surface at an angle with respect to said face and defining a light corner within said second material portion at said surface, said second substrate further having a light receiving surface defined by a plane intersecting said face and said planar top surface at a predetermined angle with respect to said top surface, a layer of relatively low refractive index material formed on said planar top surface having a thickness ranging from ⅛ to ¼ of the equivalent vacuum wavelength at the coupler operating wavelength, and an optical waveguide formed along the upper surface of said layer extending to said tip and overlapping and extending beyond said light corner, so that when light energy of a predetermined operating wavelength is incident said light receiving surface at a predetermined entrance angle with respect to said top surface it illuminates a portion of said planar top surface adjacent said corner and is coupled to said waveguide and travels to said tip to illuminate an associated surface and light energy reflected from said associated surface is coupled to said waveguide and travels along said waveguide to a point beyond said light corner.

2. A coupler as in claim 1 whereby said angle between the face and top surface is a right angle to form a prism having a right angle light corner.

3. A coupler as in claim 2 wherein said first substrate material is sapphire, said second material is rutile and said layer is silicon dioxide.

4. A coupler as in claim 2 wherein said first substrate material is quartz.

5. A coupler as in claim 2 wherein said waveguide is of rectangular configuration and formed of $Ta_2O_5$.

6. A coupler as in claim 2 together with means for positioning a source of light energy of a predetermined operating wavelength incident said light receiving surface so that a portion of said planar top surface is illuminated whereby said light energy is coupled to said waveguide.

7. A coupler as in claim 6 together with a source of light energy having a beam in the range of 4 milliradians or less collimation.

8. A coupler as in claim 7 wherein said source is a laser beam.

9. A coupler as in claim 7 wherein said source is a fiberoptic bundle adapted to be coupled to a remote illumination source.

* * * * *